UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF PREPARING SILICON-MONOXID POWDER.

No. 875,676.  Specification of Letters Patent.  Patented Dec. 31, 1907.

Application filed June 10, 1905. Serial No. 264,555.

*To all whom it may concern:*

Be it known that I, HENRY NOEL POTTER, a citizen of the United States, and resident of New Rochelle, county of Westchester, State of New York, have invented certain new and useful Improvements in Methods of Preparing Silicon - Monoxid Powder, of which the following is a specification.

In an application for Letters Patent of the United States Number 238,925, filed December 30, 1904, I have described a method of producing silicon monoxid and have also the product itself. The main portion of the product appears in the form of a finely divided powder, while a smaller portion appears in vitreous form.

I have found that the powder is especially available for certain useful applications in the arts and that its range of utility is apparently wider than that of the vitreous substance. Accordingly, I have devised means for reducing the vitreous monoxid to the form of a finely divided powder and such means form the subject of the present invention and application.

The vitreous silicon monoxid is broken into granular form and charged into an electric furnace, preferably of the vacuum type, and there subjected to a high temperature, whereby I find it is not melted into a bath, but appears to be sublimed or volatilized, and driven away from the high temperature locus, cooling and settling in the finely divided state referred to in the aforementioned application.

It is not necessary to remove the vitreous silicon monoxid from adhering silica, silicon carbid, or carbon, as these substances can react in a manner described in my former application to liberate silicon monoxid, a reaction which can go on together with the transformation of vitreous into powdered silicon monoxid, as herein specified.

It is a matter of economy to be able to use the vitreous monoxid, which is a by-product of silicon manufacture, as a raw material for producing the useful, powdery modification of silicon monoxid. In using the term "silicon monoxid", I do not refer exclusively to the pure material, but to such crude material, chemically speaking, as is produced from sources of usual commercial purity.

I claim as my invention:—

1. The method of producing silicon monoxid powder which consists in distilling vitreous silicon monoxid.

2. The method of producing silicon monoxid powder, which consists in highly heating vitreous silicon monoxid in an electric furnace in the absence of oxidizing gases.

3. The method of producing silicon monoxid powder, which consists in highly heating vitreous silicon monoxid in an electric furnace in the absence of oxidizing gases, under reduced pressure.

4. The method of producing silicon monoxid powder, which consists in heating a combination of vitreous SiO with a reactive mixture yielding silicon monoxid.

Signed at New York, in the county of New York, and State of New York, this seventh day of June A. D. 1905.

HENRY NOEL POTTER.

Witnesses:
  WM. H. CAPEL,
  GEORGE H. STOCKBRIDGE.